(No Model.)
W. P. BULLARD.
BIT BRACE.
No. 347,417. Patented Aug. 17, 1886.
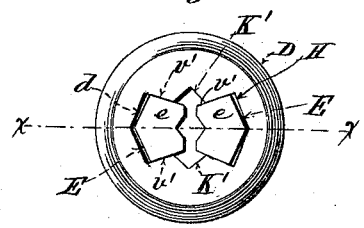
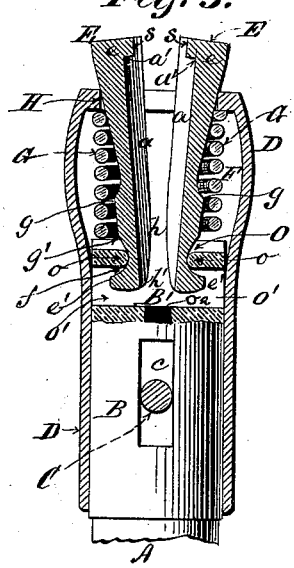 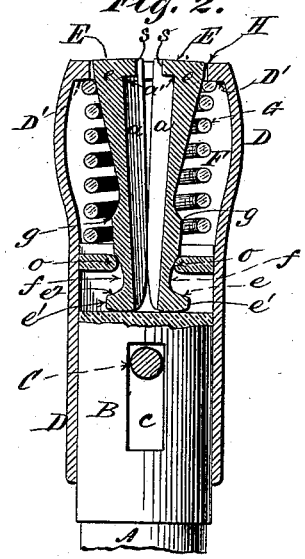 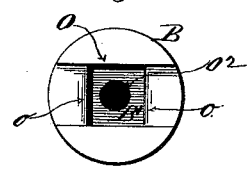
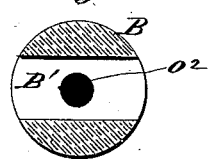
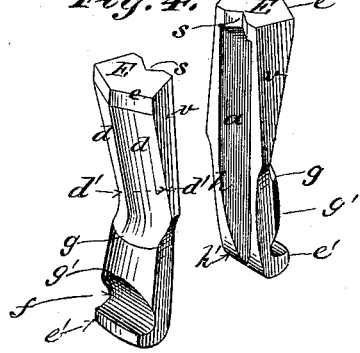
Witnesses:
Geo. W. Hiatt
Wm. Gardner
Inventor:
William P. Bullard
By his Attorney
Willard Parker Butler

UNITED STATES PATENT OFFICE.

WILLIAM P. BULLARD, OF NEW YORK, N. Y., ASSIGNOR TO THE FULLER MANUFACTURING COMPANY, OF SAME PLACE.

BIT-BRACE.

SPECIFICATION forming part of Letters Patent No. 347,417, dated August 17, 1886.

Application filed October 27, 1885. Serial No. 181,079. (No model.)

*To all whom it may concern:*

Be it known that I, WILLIAM P. BULLARD, a citizen of the United States, and a resident of New York, in the county of New York and State of New York, have invented certain new and useful Improvements in Bit-Braces, of which the following is a specification.

My invention relates to an improvement in bit-braces; and the object of same is to provide an improved construction of brace or holder, in which the bit may be attached or removed without the delay and inconvenience incident to the use of the usual form of screw-cap or sleeve, and at the same time be held with the greatest possible firmness and rigidity.

My invention, which is an improvement upon that for which Letters Patent of the United States No. 320,868 were issued to the Fuller Manufacturing Company of the city of New York upon the 23d day of June, 1885, on the application of Hiram E. Fuller, has, like the invention described and claimed in said Letters Patent, a further design, which is, namely, to simplify and improve the construction of bit-braces, to render them less expensive in manufacture, and to permit the receival or withdrawal of a bit by the vertical movement of a sliding sleeve, and to retain the same by means of the action of a spring within the sleeve when the same is released.

My invention will be best understood by reference to the accompanying sheet of drawings, forming a part of this specification, in which—

Figure 1 is an end view of the brace; Fig. 2, a vertical section upon the line $x\,x$ of Fig. 1; Fig. 3, a vertical section upon the line $x\,x$ of Fig. 1, showing the jaws distended; Fig. 4, an isometric view of the jaws; Figs. 5 and 6, views of details of the socket.

Similar letters refer to similar parts throughout the several views.

In the drawings, A represents a portion of the handle of the brace, which handle is of the ordinary form, and is provided with a socket, B, cast in a solid piece with the handle or attached thereto in any convenient manner. The extremity of the socket contains a rectangular recess, B', designed to receive the upper extremities of the clamping-jaws. The socket-head B is cast with a rectangular opening, O, passing transversely across the head of the same, so as to leave two holding-pins, $o\,o$, Figs. 2, 3, and 5. The inner edges of these holding-pins may be made slightly rounded or beveled, as shown in the views, as may be found convenient for the purpose of facilitating the movement of the clamping-jaws. A sliding sleeve, D, made of metal or any convenient material, fits over the socket B, and is held in position over the same by means of a transverse pin, C, passing through an elongated slot, $c$, in the socket B.

E E represent the clamping-jaws, which hold the bit in the brace, and which play in the rectangular opening O in the extremity of the socket between the holding-pins $o\,o$. These jaws are substantially of the shape shown, and may be made of metal or any convenient material. The outer extremities, $e\,e$, of these jaws pass through an opening or seat, H, in the head of the sleeve D, of the peculiar shape shown in Fig. 1, and are recessed interiorly at the extremities, as shown in Figs. 1, 2, and 3, so that the shaft of the bit may pass through them and allow the tang thereof to rest and be clamped firmly in the jaws when the same are brought together. The jaws are also beveled interiorly with the bevels $a\,a$, as shown in Fig. 4, so as to form a seat for the tang after clamping. The beveled surfaces $a\,a$ terminate at the points $a'\,a'$, and form in the extremity of each jaw a shoulder, $s\,s$, which prevents the bit from being pulled out. The jaws are made tapering, as shown in Fig. 4, from their outer extremity to the points $g\,g$, the width of the surfaces $d\,d$ being always constant, although the actual cross-section decreases gradually in size. By reason of the tapering of the jaws a space, F, is left between them and the inner walls of the sleeve D, which incloses the jaws when the bit is secured, in the manner shown in the drawings, and the jaws are allowed to recede from each other at their outer or larger extremity when the sleeve D is drawn down.

The inner ends of the jaws E E are of the peculiar shape shown in the drawings, and each terminates in a curved ear, $e'\,e'$. The beveled and tapered surfaces of the jaws $d\,d$ terminate at the point $g'$ in the short flat surfaces $g'$ $f$ $g'$ $f$, Figs. 2, 3, and 4. From the point $f$ to the point $e^2$ the surface is that of a simple curve, and from the point $e^2$ to the point $e'$ at the extremity of the ear the surface is flat, but slightly inclined, as shown in Figs. 2 and 3.

In the invention described in the above-mentioned Letters Patent the jaws E E were made rectangular in cross-section. In the present invention, however, the cross-section of each jaw is an irregular pentagon, as shown in Figs. 1 and 4, and both jaws when placed in position fit into a corresponding irregular opening, H, in the sleeve-head, as shown in Fig. 1.

By giving to the jaws E E and the opening in sleeve-head H the peculiar irregular cross-section shown in the views, all twisting of the jaws in the brace is obviated, and by beveling the tapered jaws in the manner shown in Fig. 4, thereby giving to them their peculiar wedge shape, it is possible to prevent the twisting action of the bit while boring, as an equal amount of surface to withstand the strain is presented at all points to which the jaws are distended, as shown by the letters $d'$ $d'$ in Fig. 4. The strain increases with the size of the bit, for the larger the bit-tang is the farther the jaws are distended; hence the actual cross-section of the jaws represented by the surfaces $d'$ $d'$ and $v$ $v$ is also of use in resisting the twist of the bit in boring. The amount of surface so resisting is decreased in proportion as the jaws are distended, and by means of the peculiar dovetail shape and inclination of the walls $v$ $v$, as well as of the dovetailed opening H in sleeve-head, through which the jaws E E pass when the spring G is depressed, the upper extremities of the jaws are caused to recede from each other and open to admit the bit-tang. The interior walls of the jaws are made slightly tapering between the points $h$ $h$ and $h'$ $h'$, as shown in Figs. 2, 3, and 4, to permit of their being more easily inserted into the socket.

The particular shape of the jaws, and more especially of their inner ends, is an important feature of the invention, for the reason that by means of the construction hereinbefore described the jaws are better able to grasp and hold the smaller extremity of the tang. The clamping-jaws are surrounded by a spiral spring, G, of any convenient material and dimensions, fitting loosely over the same within the sleeve D and held in position by the shell and jaws together. The inner extremity of this spring rests upon the upper surface of the socket B, while the outer extremity bears upon the shoulder D' upon the outer end of the sleeve D. The head of the sleeve contains, in addition to the opening H, two rectangular cuts or openings, $k'$ $k'$, of sufficient dimensions to admit of the insertion into the distended jaws of a bit-tang of any desired size.

The mode of operation of the brace is substantially as follows: When it is desired to insert a bit, the sleeve D is drawn downward and the spring G compressed. The tapering jaws thereupon separate at their outer extremities through the action of the walls $v'$ $v'$ in the dovetailed opening H in the sleeve-head H and admit the bit-tang. Upon releasing the sleeve the force of the spring will cause the sleeve to fly back upon the jaws, thereby holding the large extremity of the bit-tang firmly between them, with the other portions of the bit-tang in the recess cut in the interior walls of the jaws. Owing to the loose fitting of the jaws in the socket B the latter are allowed a slight amount of longitudinal play or thrust in their seats in the socket-head. After the spring G has been released and pressure is applied upon the cutting end of the bit, the jaws will be forced upward in the socket, and the interior extremity of the jaws, or their ears, upon coming in contact at the point $f$ $f$ with the fixed holding-pins $o$ $o$ in the bit-socket, will be gradually forced together until they seize the smaller extremity of the bit-tang and hold the same firmly, thereby assuming the position shown in Fig. 3, with the fixed holding-pins $o$ $o$ resting upon the curved surface of the ears. In this way both extremities of the bit-head are firmly clamped, and it is quite immaterial whether the intermediate portion of bit-tang is clamped or not. The longitudinal play or thrust of the jaws will vary with the size of the tang.

In order to facilitate the longitudinal motion of the jaws in the opening H, the walls of the same may be beveled inwardly at slight angles, as may be found desirable. To prevent the irregular dropping or emerging of the jaws when not holding the bit-head, the height of the openings $o'$ $o'$, into which the ears pass, is made as small as possible, so as give the jaws only such longitudinal play or thrust as will enable them to grasp and hold the smaller end of the bit-tang, and the extremity of the curved ears of the jaws from the point $f$ to the point $e^2$ is curved more rapidly than above the point $f$.

The bottom of the rectangular opening O may be cast with a small annular opening, $o^2$, as shown in Figs. 3, 5, and 6, so as to admit of the insertion of the end of the tang in case an unusually small tang is used, and thereby facilitate the same being more rigidly held.

I am aware that various forms of bit-braces have been invented provided with tapering jaws. I am, however, not aware of any in which the jaws are constructed in the peculiar irregular wedge shape shown herein; hence I do not claim tapering jaws, broadly; but What I do claim as my invention is—

1. In a bit-brace, the combination, substantially as hereinbefore set forth, of a socket having a rectangular transverse recess at its outer extremity, a pair of irregularly-shaped tapering clamping-jaws terminating in curved and beveled ears at the inner extremities, a pair of cross-pins extending across the said recess and made in one piece with the socket for securing the ends of said jaws, a sliding sleeve fitting over said jaws and socket, and a corresponding irregular opening in said sleeve-head through which said jaws pass, a coil-spring secured between the jaws and sleeve, and means, substantially as described, for securing said spring and sleeve and allowing said jaws a slight longitudinal movement, for the purposes set forth.

2. In a bit-brace, the combination, substantially as hereinbefore set forth, of a socket having a transverse recess at its outer extremity for receiving the clamping-jaws, and a pair of cross-pins in said recess for securing the same, made in one solid piece with the socket.

3. In a bit-brace, the combination, substantially as hereinbefore set forth, with a recessed socket, a coil-spring, and a sliding sleeve, of a pair of clamping-jaws provided with horizontally-inclined beveled edges $v\ v$, and an opening in the sleeve-head to admit said jaws, provided with corresponding surfaces, whereby the jaws are caused to recede from each other upon drawing down said sleeve.

4. In a bit-brace, the combination, substantially as hereinbefore set forth, with a recessed shank, a coil-spring, and a sliding sleeve, of a pair of irregular wedge-shaped clamping-jaws provided with the tapering beveled surfaces $d\ d$, of equal size, and a corresponding irregular opening in the head of the sleeve through which said jaws pass, whereby the sleeve engages the jaws equally at all points.

5. In a bit-brace, the combination, substantially as hereinbefore set forth, with a socket provided with a transverse recess at its outer extremity, a coil-spring, and a sliding sleeve, of a pair of irregular wedge-shaped jaws terminating at their inner ends in curved and beveled ears, and a pair of cross-pins securing said jaws loosely in said recess, whereby the same are forced together by the longitudinal movement of the ears upon the cross-pins.

Signed at New York, in the county of New York and State of New York, this 23d day of October, A. D. 1885.

WILLIAM P. BULLARD.

Witnesses:
WILLARD PARKER BUTLER,
SAMUEL S. WATTERS.